United States Patent [19]
Middelbeek

[11] 3,933,654
[45] Jan. 20, 1976

[54] OIL SEPARATOR FOR SEPARATING OIL LIGHTER THAN THE PURIFIED LIQUID BEING IN A VERY PURE STATE

[75] Inventor: Cornelis Gerardus Middelbeek, Nootdorp, Netherlands

[73] Assignee: Frederic R. Harris (Holland) B.V., Netherlands

[22] Filed: June 19, 1973

[21] Appl. No.: 371,349

[30] Foreign Application Priority Data
June 21, 1972 Netherlands ................. 7208503

[52] U.S. Cl. ........................... 210/521; 210/23
[51] Int. Cl.² ........................................ B01D 17/02
[58] Field of Search ....... 210/23, 84, 513, 519, 521, 210/532, 533, 536, 540, DIG. 5, DIG. 21; 55/445

[56] References Cited
UNITED STATES PATENTS

| | | | |
|---|---|---|---|
| 367,308 | 7/1887 | Macnab et al. | 210/521 |
| 917,400 | 4/1909 | Austin | 55/445 |
| 976,923 | 11/1910 | Rothwell | 210/306 |
| 1,161,197 | 11/1915 | Corwin | 210/257 X |
| 1,661,284 | 3/1928 | Fuqua et al. | 210/DIG. 5 |
| 1,825,550 | 9/1931 | Schulte | 210/521 |
| 1,873,597 | 8/1932 | Jones | 210/23 |
| 2,666,739 | 1/1954 | Packie | 210/533 X |
| 2,793,186 | 5/1957 | Dunell et al. | 210/533 X |
| 2,820,550 | 1/1958 | Sorg | 210/532 R |
| 3,482,694 | 12/1969 | Rice et al. | 210/84 X |
| 3,529,728 | 9/1970 | Middelbeek et al. | 210/540 X |
| 3,812,966 | 5/1974 | Beach et al. | 210/84 |
| 3,813,851 | 6/1974 | Eder | 210/521 X |
| 3,852,199 | 12/1974 | Wachsmuth et al. | 210/522 |

FOREIGN PATENTS OR APPLICATIONS

| | | | |
|---|---|---|---|
| 308,752 | 8/1929 | United Kingdom | 210/533 |
| 994,118 | 9/1952 | France | 210/521 |
| 71,350 | 7/1915 | Austria | 210/513 |
| 237,539 | 4/1909 | Germany | 210/533 |

*Primary Examiner*—Charles N. Hart
*Assistant Examiner*—Robert G. Mukai
*Attorney, Agent, or Firm*—Stevens, Davis, Miller & Mosher

[57] ABSTRACT

A device for separating oil from an oil laden liquid in which a tank having an inlet and outlet in opposite side walls has at least two parallel inclined plates between them to define a tortuous path for the liquid. The plate adjacent the inlet has one edge secured to the inlet wall to define a space to minimize the turbulence of the incoming liquid.

10 Claims, 4 Drawing Figures

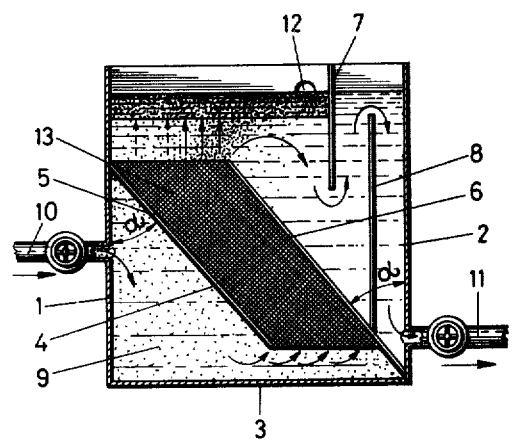
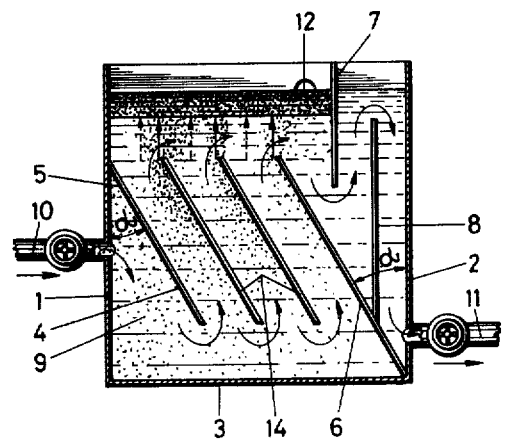
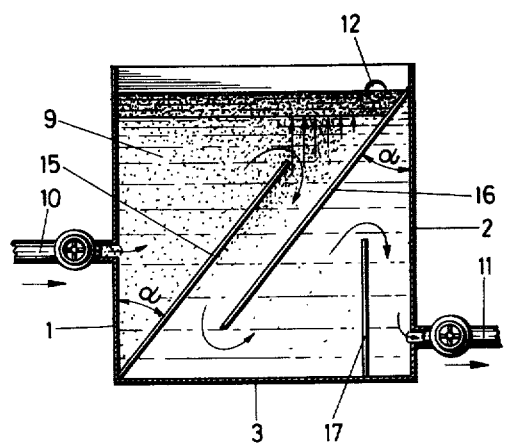
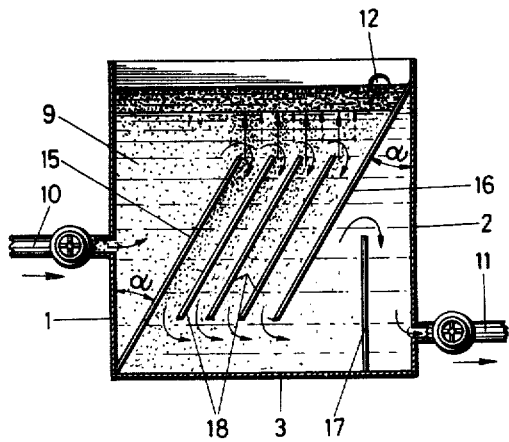

OIL SEPARATOR FOR SEPARATING OIL LIGHTER THAN THE PURIFIED LIQUID BEING IN A VERY PURE STATE

The invention relates to a device for separating oil from an oil laden liquid in which the oil is lighter than the purified liquid being in a very pure state, comprising a tank with an oil separator having at least two parallel inclined plates spaced from each other, with outlet means for said oil at its upper side, with an overflow between said oil separator and outlet means for the purified liquid, and with a space between an inlet of said oil laden liquid at the front wall of said tank and the entry into said separator to eliminate the turbulence of said oil laden liquid before entrance into the separator as much as possible, known as such.

In the prior art such as disclosed in the applicant's prior U.S. Pat. No. 3,529,728 a space is bound by a bottom, a front wall, side walls of the tank and also by a baffle extending horizontally from the front wall. The outer plates of the parallel plates of the oil separator, which are placed above each other are connected to the horizontal baffle and the bottom respectively and form a relative small angle with the bottom. The plates of this prior art device are provided at the upper side with protruding fingers, so that the complete device takes up much space. Above as well as under the separator are spaces not necessary for the operation of the device.

It is an object of this invention to provide an oil separating device of the kind mentioned in the first paragraph which is compact, inexpensive and able to reach a high degree of purity of the purified liquid, e.g. of the order of magnitude of 10 ppm oil. To this end the outer plate of the parallel plates of the oil separator bounding the space between the inlet of the oil laden liquid and the entry into the separator extends from the front first wall of the tank and the other outer plate of the parallel plates of the oil separator extends substantially from the rear or second wall of the tank. Preferably the outer plate of the oil separator bounding said space extends from the front first wall of the tank downwardly and inwardly into the tank.

By this is obtained that the separated oil moves in the in the direction of flow of the liquid to be purified.

The angle between the outer plate of the oil separator bounding said space and the front wall preferably is about 30°.

According to another feature a prefabricated packet consisting of parallel plates is provided between the outer plates of the oil separator, the plates of said packet extending parallel to the outer plates of the oil separator and the extremities of all plates lying substantially in a horizontal plane through the respective free extremities of the outer plates.

By changing the distance between the outer plates and the number of inner plates it is possible to change the capacity and the separating characteristics of the oil separator in a simple way.

It is also possible to provide a co-alescention filter between the outer plates of the oil separator dependent upon the liquid to be treated.

In the accompanying drawings:

FIG. 1 is an oil separating device with a filter

FIG. 2 is an oil separating device according to FIG. 1 with a packet of plates.

FIG. 3 is a second embodiment of an oil separating device

FIG. 4 is a second embodiment of an oil separating device according to FIG. 3 with a packet of plates.

The oil separating device according to FIG. 1 consists of a tank with a front first wall 1, a rear second wall 2 and a bottom 3. In this tank is provided an oil separator 4 with parallel outer plates 5 and 6. Plate 5 extends from the front wall 1 of the tank and forms an angle $\alpha$ with this wall and ends at some distance above the bottom 3 to define a space in which the cross section increases in a direction moving away from the inlet as is shown in the drawings. Plate 6 of oil separator 4 extends upwardly from the rear wall 2 or (not shown) from the bottom 3 of the tank close to the wall 2 under the same angle $\alpha$ as plate 5 with the front wall 1 and terminates at same distance from the upper side of the tank but above the lower extremity of plate 5.

Between plate 6 of the oil separator 4 and the wall 2 of the tank there is provided a vertical baffle 7 connected to the side walls of the tank and extending from the upper side of the tank terminating at some distance from the outer wall 6 of the oil separator 4. Between the baffle 7 and the wall 2 there is provided a second baffle 8 which extends from outer plate 6 of the oil separator and terminates at some distance under the upper side of the tank but above the lower extremity of baffle 7.

In the space 9 between the front wall 1 of the tank and plate 5 of the oil separator opens a supply line 10 for the liquid to be purified. The liquid free from oil is discharged through line 11 which is in communication with the space bounded by wall 2, plate 6 and baffle 8. To discharge the separated oil there is provided an outlet pipe 12. It is also possible to apply an adjustable skimmer for the discharge of the oil.

The liquid to be purified enters the device through line 10 and flows through space 9 in which turbulence is eliminated completely or for the greater part to the entry at the lower side into the separator 4. The separated oil gathers at the upper side of the tank and is discharged through pipe 12.

The purified liquid flows from the upper side of the separator 4 underneath baffle 7 and over baffle 8 serving as an overflow to line 11 where it is discharged. Arrows show the paths of the liquids.

If desired, dependent upon the material to be treated, it is possible to provide a coalescention filter 13 between the plates 5 and 6.

In FIG. 2 parts corresponding to those of FIG. 1 are provided with the same reference numerals. In FIG. 2 is indicated that it is possible to increase the capacity to provide a packet consisting of parallel plates 14 between the outer plates 5 and 6 of the oil separator. The number of plates and their mutual distance can be chosen dependent of the desired capacity of the oil separating device.

FIG. 3 shows another embodiment of a compact separating device. The outer plate 15 of the oil separator 4 in this embodiment does not extend from the front wall 1 of the tank downwardly and inwardly but upwardly and inwardly into the tank. The other outer plate 16 parallel to plate 15 extends from wall 2 of the tank and terminates at some distance from the bottom 3 of the tank. A vertical baffle 17, as is true with all the plates in the tank, connects to the side walls of the tank, extends from the bottom 3 and terminates at some distance from plate 16 of the oil separator. The path of the different liquids is indicated with arrows.

It is also possible in the oil separator according to FIG. 3 to fit a packet consisting of parallel plates 18 as shown in FIG. 4. It is also possible to provide a coalescention filter.

In both embodiments the capacity and the power to separate of the device can be varied by varying the number of the plates of the packet. In this way it is possible to vary the capacity of the devices e.g. between 3 and 35 m³/h.

As an example a device with a capacity of 35 m³/h and comprising a packet with e.g. seven plates has horizontal dimensions of 1.3 × 1.0 meters and a height of 1.3 meters with the distance of the oil separator to the bottom and the upper edge of the tank being 0.2 meters and 0.3 meters respectively.

The packet of plates comprises a number of complete identical parallel standard plates reduces the cost of manufacture. It is possible to provide the plates with fingers as disclosed in the prior art or to bend the upper extremities of the separate plates such that coalescention of the oil drops is stimulated. In this case it is possible that the upper extremities of the separate plates are inclined and that the plates in the same packet have an opposite inclination.

The angle α between the outer plates of the oil separator and the front and rear walls of the tank preferably is about 30°. With this angle the space necessary for the oil separator is small and such a device has a good separation of the oil.

Though the embodiment according to FIGS. 3 and 4 guarantees a good separation and is somewhat simpler in construction, the embodiment according to FIGS. 1 and 2 is preferred, because the flow of the liquid to be purified and the separated oil is in the same direction.

I claim:

1. A device for separating oil from an oil laden liquid comprising:
   a. a tank having oil laden liquid, side walls and a bottom with an inlet in a first side wall below the surface of said oil laden liquid for introducing the oil laden liquid and an outlet in a second side wall for the purified liquid;
   b. means for separating oil from an oil laden liquid comprising at least two parallel inclined plates spaced from each other in the tank;
   c. one of the parallel plates extending at an incline from and having one edge fixed to the first side wall to define a space with said first side wall adjacent the inlet to minimize the turbulence of the incoming liquid;
   d. the other parallel plate extending from and having one edge fixed to the second side wall to define a second space adjacent the outlet;
   e. each plate having a free edge opposite its fixed edge, one free edge pointed upwardly and the other free edge pointed downwardly;
   f. oil discharge means near the top of the tank for removal of the separated oil whereby oil laden liquid entering into said tank through the inlet has the turbulence thereof almost completely eliminated before entry into one end of said separating means wherein the oil is separated from the oil laden liquid so that the separated oil gathers near the top of the tank and is discharged therefrom through said discharge means and the purified liquid then flows from the other end of the separating means and is discharged through the outlet.

2. The device of claim 1 in which the plate extending from the first side wall is inclined downwardly and inwardly in the tank.

3. The device of claim 1 in which the plate extending from the first side wall is inclined upwardly and inwardly in the tank.

4. The device of claim 1 in which the angle between the first side wall and its plate is about 30°.

5. The device of claim 1 wherein said separating means further comprises a plurality of additional plates between said parallel plates with the extremities of all plates being in a substantially horizontal plane.

6. The device of claim 1 including a coalescor between the parallel plates.

7. The device of claim 6 wherein said coalescor is a coalescention filter.

8. The device of claim 1 including a substantially vertically extending plate adjacent said outlet and of lesser vertical length than the inclined plates.

9. The device of claim 8 including a second substantially vertical plate which is spaced from first mentioned vertical plate in overlapping relation.

10. The device of claim 1 wherein said discharge means comprises an outlet pipe.

* * * * *

UNITED STATES PATENT AND TRADEMARK OFFICE
CERTIFICATE OF CORRECTION

PATENT NO. : 3,933,654
DATED      : January 20, 1976
INVENTOR(S) : Cornelis Geradus Middelbeek It is certified that error appears in the above-identified patent and that said Letters Patent are hereby corrected as shown below:

Assignee: Part interest to
Frederic R. Harris (Holland) B.V.,
Netherlands

Signed and Sealed this

Nineteenth Day of October 1976

[SEAL]

Attest:

RUTH C. MASON
*Attesting Officer*

C. MARSHALL DANN
*Commissioner of Patents and Trademarks*